E. L. SHARPNECK.
CAR AXLE BOX AND SADDLE.
APPLICATION FILED MAY 19, 1909.
977,139.
Patented Nov. 29, 1910.
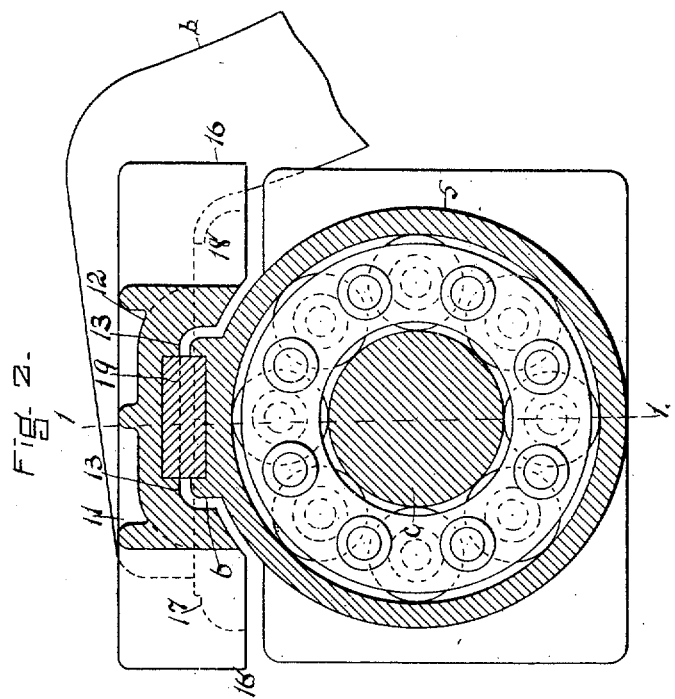
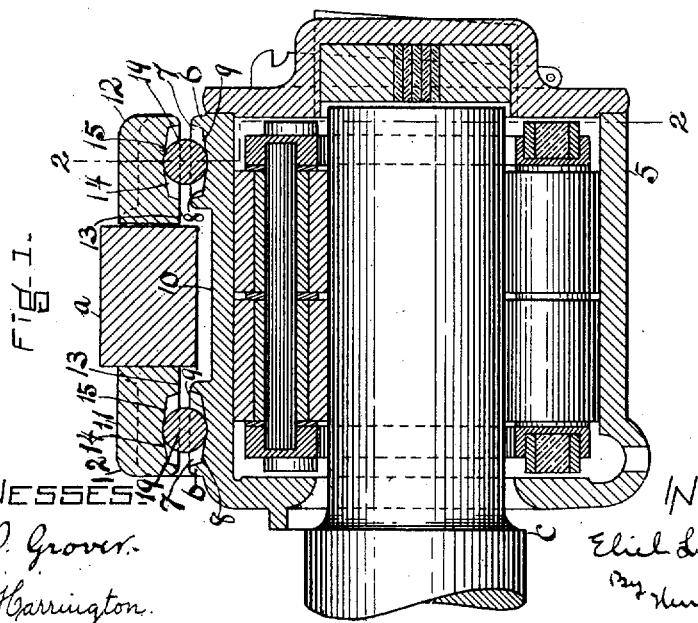
WITNESSES
A. D. Grover.
M. M. Harrington.
INVENTOR
Eliel L. Sharpneck
By Henry J. Miller
atty.

UNITED STATES PATENT OFFICE.

ELIEL L. SHARPNECK, OF WINTHROP, MASSACHUSETTS.

CAR-AXLE BOX AND SADDLE.

977,139. Specification of Letters Patent. Patented Nov. 29, 1910.

Application filed May 19, 1909. Serial No. 497,067.

*To all whom it may concern:*

Be it known that I, ELIEL L. SHARPNECK, of Winthrop, in the county of Suffolk and State of Massachusetts, have invented a new and useful Improvement in Car-Axle Boxes and Saddles, of which the following is a specification, reference being had to the accompanying drawings, forming part thereof.

This invention relates to improvements in car axle boxes and saddles therefor.

The object of the invention is to so construct a car axle box and a saddle therefor that said parts may have a relative movement without undue increase in height.

Another object of the invention is to improve the general construction of car axle boxes and their saddles.

The invention consists in such peculiar features of construction and combination of parts as shall hereinafter be more fully described and pointed out in the claims.

Figure 1, represents a partial sectional view of the improved car axle box and saddle taken on line 1—1 Fig. 2. Fig. 2, represents a similar view taken on line 2—2 Fig. 1.

Similar numbers of reference designate corresponding parts in both figures.

As shown in the drawing 5 represents a car axle box adapted to contain a bearing of any well known construction adapted to receive a car axle. The upper portion or top of said box 5 has at its inner and outer end portions the turrets 6—6 having in their tops transversely extending compartments 7—7 the bottoms of which are shaped to form the oppositely inclined ways 8 and 9. Between said turrets 6—6 the wall of box 5 is reduced in thickness to form the depression 10.

The saddle, indicated as a whole by the reference numeral 11, has the side bars 12—12 the lower surfaces 13—13 of which are furnished with cavities having the oppositely inclined surfaces 14—15 while the end portions 16—16 of said bars depend below such surfaces 13—13 and are connected in pairs by the transverse supporting ribs 17 and 18. Between the cavities 7—7 of the turrets 6—6 and the corresponding cavities of the side bars 12—12 are rolls 19—19 which support the saddle 11.

The ribs 17 and 18 form supports for the end portions *a* of the well known side frames *b* and the inner vertical surfaces of the side bars 12—12 from side bearings for said ends *a*.

In use, movement of the saddle 11 in a direction transverse of the axes of the rolls 19—19 is resisted by the inclined surfaces 8 or 9 and 14—15 of the respective cavities and when strain, in such direction, on the saddle ceases said rolls return to the positions shown in Fig. 1.

By this construction the end *a* of the side frame *b* is supported below the axes of the rolls 19—19 and close to the bearing contained in the box 5. This feature being particularly desirable where the car axle *c* is journaled in an antifriction or roller bearing contained within the box 5 of which class of bearings one form is illustrated herein.

Having thus described my invention I claim as new and desire to secure by Letters Patent.

1. The combination with a car axle box having a pair of turrets furnished with depressions, and rolls contained in said depressions, of a saddle having inverted seats, to receive said rolls, and side bearings and supports for side frames, said supports being below said last mentioned cavities.

2. The combination with a car axle box having a pair of turrets and a depression between said turrets, and antifriction bearings carried by said turrets, of a saddle mounted on said bearings and having depending members furnished with end frame supports the upper surfaces of which are below the tops of said turrets.

3. The combination with a car axle box having transverse ways, and rolls rotatable in said ways, of a saddle having side bars mounted on said rolls and having depending ends connected in pairs by ribs whereby the supporting surfaces of said ribs are below the axes of said rolls.

4. The combination with a car axle box having turrets furnished with depressions each having a pair of oppositely inclined surfaces, and rolls in said depressions, of a saddle having cavities, to receive said rolls, each having a pair of oppositely inclined surfaces, said saddle having side frame supports located below said cavities.

ELIEL L. SHARPNECK.

Witnesses:
HENRY J. MILLER,
M. M. HARRINGTON.